March 17, 1964     H. MOORMANN     3,124,842
METHOD AND APPARATUS FOR MOLDING A DOLL'S HEAD
Filed Jan. 22, 1962     2 Sheets-Sheet 2

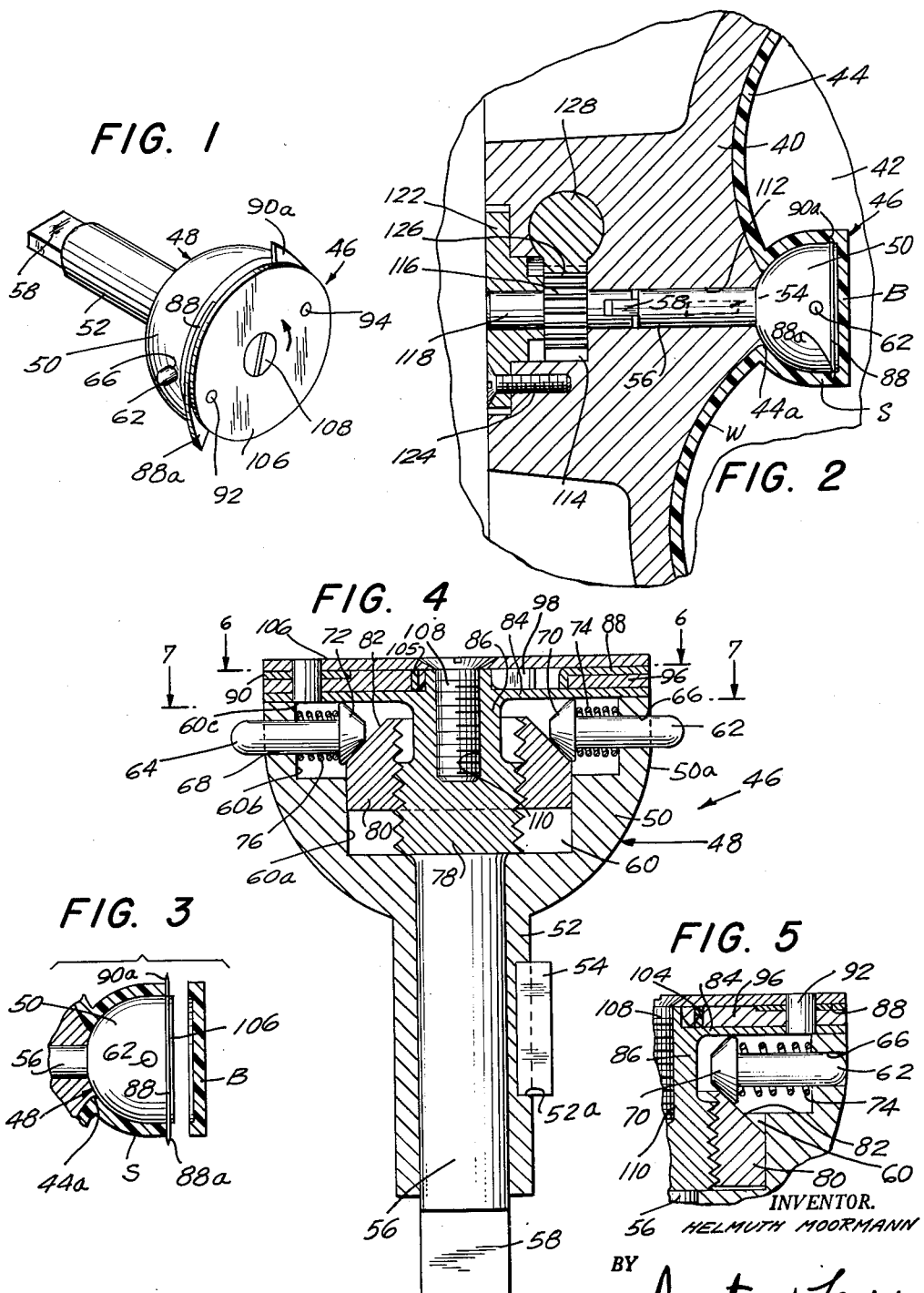

INVENTOR.
HELMUTH MOORMANN
BY Amster + Levy
ATTORNEYS

United States Patent Office 3,124,842
Patented Mar. 17, 1964

3,124,842
METHOD AND APPARATUS FOR MOLDING A DOLL'S HEAD
Helmuth Moormann, Elmont, N.Y., assignor to Ideal Toy Corporation, Hollis, N.Y., a corporation of New York
Filed Jan. 22, 1962, Ser. No. 167,513
10 Claims. (Cl. 18—34)

The present invention relates generally to the molding of a doll's head, and in particular to an improved apparatus and method for the molding of a doll's head including eye openings bounded by inwardly projecting eyeball sockets, each of which is adapted to receive a pivoted eye assembly.

Of recent times, heads for dolls have been manufactured on blow molding equipment wherein a parison of an appropriate plastic is extruded between the front and rear mold sections of a two-section mold. The front and rear mold sections each have mold walls in the appropriate contour and outline of the configuration for the particular doll's head which define a mold cavity. After the extrusion of the parison, the front and rear mold sections are closed, with the aid of appropriate aligning pins and bores, and the entrapped segment of the parison is blown to conform to the mold cavity. The resultant one-piece doll's head is then stripped from the mold and a neck opening is cut therein to permit access to the interior of the head for further manufacturing operations which include, without limitation, the rooting of hair into the scalp of the doll, the mounting of pivoted eye assemblies in the respective eye openings, the addition of tearing mechanisms, and the like. Heretofore, it has usually been the practice to mold the doll's head in respective front and rear sections, and preliminary to the final assembly of such sections, to make the necessary internal assemblies. In some instances where a one-piece doll's head was prepared by rotational molding techniques, it was the practice to provide a removable scalp portion which permitted ready access to the interior of the doll's head for making the internal assemblies.

With the advent of blow molding techniques for the manufacture of heads for dolls, there developed the need for concurrent provision incident to molding of respective eye openings each bounded by an inwardly projecting semi-spherical eyeball socket. If this could be achieved, the subsequent mounting of respective pivoted eye assemblies in the thus formed eyeball sockets would become a relatively simple matter since the respective eye assemblies could be inserted through the skull or neck opening of the doll, seated in the respective sockets, and appropriately mounted in place.

Broadly, it is an object of the present invention to provide an improved apparatus and method for the molding of heads for dolls which realizes one or more of the aforesaid objectives. Specifically, it is within the contemplation of the present invention to provide an apparatus and method for molding a doll's head which includes eye openings at the opposite sides of the bridge of the nose of the doll's head each of which is bounded by an inwardly projecting substantially semi-spherical eyeball socket forming wall of progressively increasing circular cross section having trunnion openings for receiving and mounting a pivoted eye assembly.

It is a further object of the present invention to provide an improved method and apparatus for the manufacture of a doll's head which enables substantial economies to be realized in the provision of respective pivoted eye assemblies in the head.

In accordance with apparatus aspects of the present invention, there is provided an insert which is adapted to be mounted in the front mold section of a mold and includes an insert body providing a semi-spherical molding surface. Opposed pins project from the semi-spherical molding surface and are disposed at right angles to the axis of symmetry thereof. The pins are mounted for movement between retracted and extended positions relative to the semi-spherical molding surface, with respective springs normally biasing the pins into the retracted position. The semi-spherical molding surface and the opposed pins when in the extended position have built up thereon during the molding process a semi-spherical eyeball socket wall having opposed trunnion openings therein. At least one cutter blade is mounted on the insert body for outward movement in a cutting plane, with means being provided to dispose the cutter blade in a normal position extending beyond the semi-spherical molding surface such that the cutter blade is embedded in the socket wall incident to molding. Actuating means are operatively connected to the cutter blade for moving the same about the axis of symmetry and for simultaneously moving the opposed pins to the retracted position. Accordingly, after the molding of the socket wall about the insert body and about the projecting pins, the cutter blade may be actuated to cut away a portion of the socket wall to define a semi-spherical eyeball socket of progressively increasing circular cross section in the doll's head. Concurrently, the opposed projecting pins may be retracted to facilitate the stripping of the insert body from within the doll's head.

The above brief description of the apparatus aspects of the invention, as well as method aspects as well as further objects and advantages of the present invention, will be best appreciated by reference to the following detailed description of a presently preferred, but nonetheless illustrative apparatus, when taken in conjunction with the accompanying drawings, wherein:

FIG. 1 is a perspective view of an eye insert embodying features of the present invention;

FIG. 2 is a fragmentary sectional view taken along the front mold section of a mold showing the outline of a front or face half of a mold cavity, with one eye insert mounted therein in accordance with the present invention;

FIG. 3 is a fragmentary elevational view similar to FIG. 2, but illustrating the cutting away of a portion of the wall molded about the insert in accordance with features of the present invention;

FIG. 4 is an enlarged sectional view taken substantially medially of the eye insert and showing the internal construction thereof, with the opposed molding pins in their extended position;

FIG. 5 is a fragmentary sectional view taken in the same plane as FIG. 4, but showing one of the molding pins in its retracted position;

Figure 8:
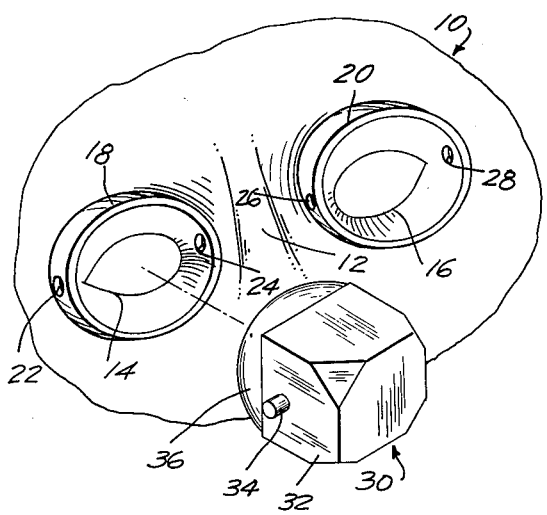
Figure 9:
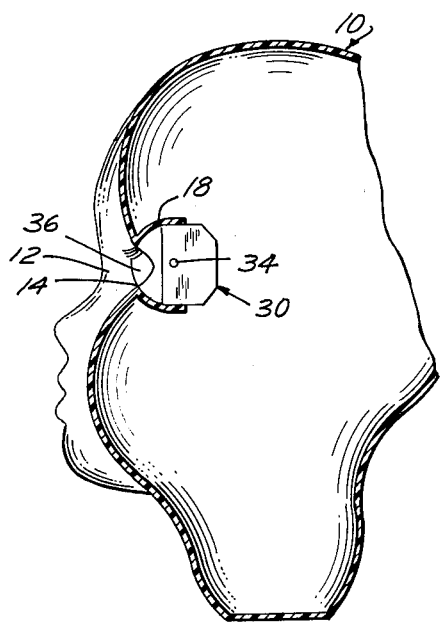

FIG. 8 is a fragmentary perspective view showing a typical doll's head which may be processed in accordance with the present invention to provide integral eyeball sockets having opposed trunnion openings therein, with a typical eye assembly being shown in position for insertion into one of the eye sockets; and FIG. 9 is a vertical section taken through a typical doll's head constructed in accordance with the present invention, showing a pivoted eye assembly journalled by opposed trunnions within the integral eyeball socket.

Preliminary to reference to FIGS. 1 through 7 inclusive for a description of typical apparatus in accordance with the present invention, reference will be made to FIGS. 8 and 9 for a description of a typical doll's head 10 which may be fabricated in accordance with the present invention. Specifically, the doll's head 10 includes a nose 12 having a bridge portion and respective eye openings 14, 16 at opposite sides thereof. The eye openings 14, 16 are bounded by inwardly projecting semi-spherical eyeball sockets 18, 20 of progressively increasing circular cross section. The eyeball sockets 18, 20 are formed with opposed pairs of trunnion openings, designated respectively by the reference numerals 22, 24 and 26, 28, which receive the corresponding trunnions or pins on commercially available eye assemblies, such as the eye assembly 30 illustrated at the left of FIG. 8. The eye assembly 30 includes a housing 32 which is provided with opposed trunnions or pins 34 which are received within the respective trunnion openings 22, 24 of the eyeball socket 18. Disposed within the housing 30 is a pivoted eyeball 36 which projects through the open front thereof. The eye opens and closes incident to the movement of the doll's head 10 between an upright or sitting position and a horizontal or reclining position, as is generally understood. Insertion of the mounting trunnions 34 of the eye assembly 30 into the corresponding trunnion openings 22, 24 is a relatively simple matter since the resiliency of the material which is employed in molding the doll's head (i.e. polyethylene) enables the trunnions 34 to be snapped into the respective trunnion openings. Although other eye assemblies may be employed in accordance with the present invention, it will be appreciated that the instant illustrative showing is typical of the relatively simple means for mounting this type of conventional eye assembly within the doll's head 10 in accordance with the teaching herein.

Referring now specifically to FIGS. 1 through 7, and first to FIG. 2, there is shown a front mold section 40 having a front or face mold cavity section 42 which is bounded by a mold wall 44 defining the desired features for the doll's face. The mold wall 44 includes regions such as illustrated at 44a, defining or outlining eye openings (i.e. openings 14, 16 in FIG. 8). Left and right eye inserts, which are identical in construction and generally designated by the reference numeral 46, are mounted within the front mold cavity section 42 in the mold wall region 44a defining the respective eye openings 14, 16. Since both the left and right inserts are of identical construction and are operated simultaneously in the same manner, it will suffice to describe in detail only the insert 46 illustrated for use in molding the left eye, it being appreciated that an identical arrangement is provided for molding the right eye. The eye insert 46, which is seen best in FIG. 4, includes an insert body 48 having a semi-spherical body section 50 providing a semi-spherical molding surface 50a. The molding surface 50a is adapted to extend inwardly of the wall region 44a (see FIG. 2) and diverge in relation to the corresponding eye opening 14 outlined or defined by the mold region 44a. The insert body 48 further includes a bearing section 52 which is integral therewith and serves as a bearing for journalling an actuating shaft 56, as will subsequently be described. The bearing section is formed on its outer surface with a keyway 52a which receives a key 54 adapted to project into a corresponding keyway in the front mold section 40 such as to mount the insert body 48 within the mold in a relatively fixed or stationary position.

Extending axially of the bearing section 52 and journalled therein is the actuating shaft 56 which is provided with a releasable driven coupling for rotating the same. The driven coupling is in the form of a projection 58 which may be connected to an appropriate rotary drive, as will be described, for rotating the actuating shaft 56. The end of the actuating shaft 56 remote from the projection 58 extends upwardly into an internal cavity 60 provided in the spherical body section 50. The internal cavity 60 has a reduced diameter section 60a and a somewhat larger diameter section 60b in communication therewith. The larger diameter section 60b has an open mouth 60c for the insertion therethrough of the several components received within the internal cavity 60.

Projecting from the semi-spherical molding surface 50a of the body section 50 are diametrically opposed molding pins 62, 64 which are mounted for movement between extended and retracted positions relative to the molding surface 58, as may be appreciated by progressively inspecting FIGS. 4 and 5. The molding pin 62 projects through a bearing opening 66 provided at right angles to the axis of symmetry of the body section 50 and opening into the cavity section 60b. Similarly, the molding pin 64 extends through a bearing opening 68 at a circumferential location 180° removed from the bearing opening 66. The outer ends of the respective molding pin 62, 64 are appropriately rounded such as to avoid sharp discontinuities for the molding operations. The inner ends of the molding pins are formed with conical cam followers 70, 72. Interposed between the bounding wall of the cavity section 60b and the respective shoulders provided by the conical followers are coil springs 74, 76 which bias the respective holding pins 62, 64 towards the retracted position illustrated in FIG. 5.

The molding pins 62, 64 are maintained in the extended position illustrated in FIG. 4 by a camming arrangement which is operable in response to rotation of the actuating shaft 56 to allow the molding pins 62, 64 to move into the retracted position illustrated in FIG. 5. Specifically, the actuating shaft 56 is provided with an integral lead screw 78 which extends into the cavity section 60a and is in threaded engagement with a cam member 80. The cam member 80 is of a diameter such that the cavity section 60a serves as a circular seat therefor and is movable in response to the rotation of the actuating shaft 56 from the operative position illustrated in FIG. 4 to the inoperative position illustrated in FIG. 5. The cam member 80 is provided with a cam track 82 which is conical in configuration and presents abutment surfaces of progressively decreasing cross section to the respective cam followers 70, 72 in response to the axial displacement of the cam member 80 from the operative position illustrated in FIG. 4 to the inoperative position illustrated in FIG. 5. When the cam member 80 is in the operative position illustrated in FIG. 4, the camming surface 82 urges the cam followers 70, 72 radially and outwardly to maintain the molding pins 62, 64 in the extended position against the biasing effect of the respective coil springs 74, 76. When the cam member 80 is moved into the inoperative position illustrated in FIG. 5, the mounting pins 62, 64 are permitted to retract under the influence of the respective coil springs 74, 76.

A cutter assembly is operatively connected to the actuating shaft 56 and is rotatable therewith for cutting away unwanted portions of the molded wall W, as will subsequently be described. The cutter assembly includes a circular base plate 84 which bridges and closes the access opening 60c for the internal cavity 60. The base plate 84 is integral with a centrally disposed hub 86 which in turn is integral with the lead screw 78. Pivotally mounted on the base plate 84 are first and second cutter blades 88, 90 which have cutting edges or tips 88a, 90a projecting beyond the semi-spherical molding surface 50a. The cutter blades 88, 90 are arranged chordwise of the base plate 84 and are pivotally mounted thereon by respective pivot pins 92, 94 (see FIG. 6). The pivoted cutter blades 88, 90 are received within appropriate cutouts 98, 100 provided in a filler plate 96 which overlies the base plate 84. The respective cut outs 98, 100 are appropriately dimensioned to accommodate the cutter blades 88, 90 with their outer faces coplanar with the outer face of the filler plate 96.

Figure 6:
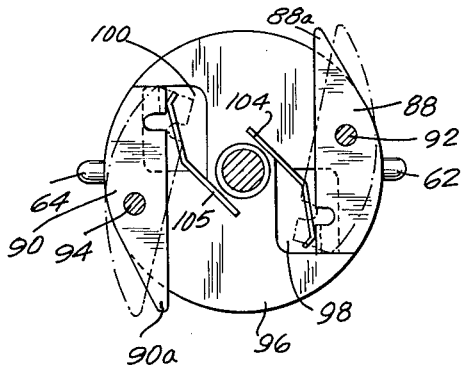
FIG. 6 is a sectional view taken substantially along the lines of 6—6 in FIG. 4, looking in the direction of the arrows and showing the mounting of the respective cutter blades incorporated in the eye insert.
Figure 7:
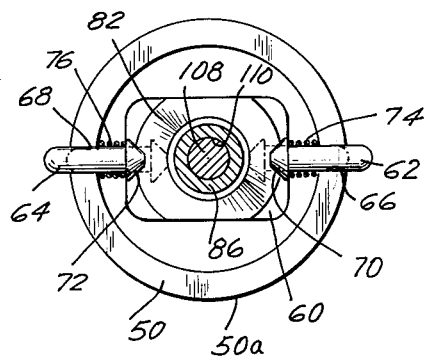
FIG. 7 is a sectional view taken substantially along the lines 7—7 in FIG. 4, and looking in the direction of the arrows, and showing the details of the cam and follower mechanisms which maintain the respective molding pin in their extended position.

The cutter blades 88, 90 are biased into the full line position shown in FIG. 6 by the provision of respective leaf springs 104, 105. The leaf springs 104, 105 are appropriately anchored in slots provided in the filler plate 96 and bear against the respective cutter blades 88, 90 to bias them into a position where the tips 88a, 90a are embedded in the molded wall W incident to the molding operation. The leaf springs 104, 105 permit the cutter blades 88, 90 to pivot outwardly into the dotted line positions illustrated in FIG. 6 about their respective pivots 92, 94 incident to the rotation of the actuating shaft 56 and the reaction force developed by the molded wall W.

Overlying the thus mounted and arranged assembly of the filler plate 96, the pivoted cutter blades 88, 90 and the respective leaf springs 104, 105 is a cover plate 106 which has circular openings receiving the pivot pins 92, 94. The cover plate 106 is secured in position by the provision of a centrally disposed threaded bolt 108 which is received within a corresponding axial threaded bore 110 provided in the hub 86.

Reference will now be made to FIG. 2 for a typical arrangement for mounting the eye insert 46 in the front mold section 40 and the imparting of drive to the actuating shaft 56. Specifically, the front mold section 40 is provided with a bore 112 which opens into the region 44a, and receives the bearing section 52 of the insert body 48. The insert body 48 is mounted in a stationary position by the key 54 which is accommodated in a corresponding keyway extending radially of the bore 112. The bore 112 opens into an appropriate chamber or cavity 114 formed in the front mold section 40 which received a driving pinion 116 carried on an associated stub shaft 118. The stub shaft 118 is in end to end alignment with the actuating shaft 56 and terminates at its inner end in a forked coupling 120 which engages the projection or ear 58 such that in response to rotation of the stub shaft 118, the actuating shaft 56 is rotated. The driving pinion 116 is confined with the chamber 114 and the stub shaft 118 is appropriately journalled by a back-up plate 122 which straddles and closes the cavity 114 and is secured to the front mold section by one or more machine screws or bolts 124. The driving pinion 116 is rotated by the provision of a rack 126 in engagement therewith which is secured to or integral with a rack-driving member 128. The rack-driving member 128 is reciprocated at right angles to the aligned stub shaft and actuating shafts 118, 56 by any appropriate means, such as a double-acting piston and cylinder (not shown) which may be selectively actuated at the appropriate time in the molding cycle by control arrangements which are generally known in the art. Accordingly, in response to reciprocation of the rack-driving member 128, the stub shaft 118 is rotated which via the releasable coupling 120, 58 rotates the actuating shaft 56. In response to such rotation, the cutting tips 88a, 90a which are embedded in the wall W of the doll's head 20 during molding, are rotated about the axis of symmetry of the eye insert 46. Due to the reaction force developed, the respective cutter blades 88, 90 will move outwardly in a common cutting plane and will cut through the socket-forming wall S, as may be appreciated by progressively inspecting FIGS. 2 and 3, to cut away the base wall B which is formed incident to the molding operation. Upon removal of the base wall B as shown in FIG. 3, it will be appreciated that there is provided a semi-spherical socket S which opens inwardly of the corresponding eye opening. The eye insert 46 may be readily stripped from its mounted position within the mold due to the provision of the releasable coupling 58, 120 and then may be stripped from within the thus formed socket S through the opening provided by the removal of the base wall B.

In order to facilitate a more thorough understanding of the present invention, a typical sequence of operations will be described:

At the start of a molding cycle, the respective left and right eye inserts 46 are inserted into corresponding bearing openings provided in the front mold section 40 at the locations 44a for the formation of the left and right eyes. The molding operation is allowed to proceed in the usual fashion such that a wall W of polyethylene or other appropriate plastic is built up and contact with the cavity wall 44 and in surrounding relation to the respective left and right eye inserts 46. As a result of such molding operation, there will be built up about the semi-spherical bodies of the eye inserts corresponding semi-spherical eyeball socket-forming walls, designated by the letter S in FIG. 2. Such walls are closed at their inner ends by integral transverse base walls B which represent excess or waste material to be cut away incident to the subsequent operation of the respective eye inserts. After the normal molding cycle is completed, the rack-driving member 128 is reciprocated to impart rotary motion to the actuating shaft 56. This, in time, will cause the respective cutter tips 88a, 90a, which had been previously embedded in the molded wall to swing outwardly incident to the reaction force developed by rotation of the respective eye inserts. The cutter blades 88, 90 will cut through the molded wall, as may be appreciated by inspecting FIGS. 2 and 3. Once the transverse bases or excess portions B of the respective eyeball sockets are cut away, the respective cutter blades 88, 90 will return to their normal position under the influence of the leaf springs 104, 105. Thereupon, in the usual fashion the molded doll's head 10 may be stripped from the cavity of the front mold section. Incident to the stripping of the doll's head from the front mold section 40, the eye inserts are removed from their mounted positions in the mold and are carried away with the doll's head. The doll's head is then provided with a skull or neck opening which enables the removal of the eye inserts from within the respective formed sockets, which eye inserts can then be reused in subsequent molding operations. Finally, the commercially available eye assemblies 30 are mounted in the respective eyeball sockets, as previously described in conjunction with FIGS. 8 and 9.

From the foregoing, it will be appreciated that there has been provided in accordance with the present invention an exceptionally simple method for the formation incident to the molding operation of integral eyeball sockets each of a construction appropriate for the ready assembly therein of commercially available pivoted eye assemblies. The described method and apparatus is thoroughly compatible with existing molding equipment and facilitates the assembly of pivoted eye assemblies within a doll's head on a mass production basis having relatively low unit cost.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a mold including a mold section having a mold wall region defining an eye opening, the improvement comprising an eye insert including an insert body providing a molding surface extending inwardly of said region and flaring outwardly in relation to said eye opening, opposed pins projecting from said molding surface, means mounting said pins for movement between retracted and extended positions relative to said molding surface, said molding surfaces and said opposed pins when in said extended position having built up thereon during molding an eyeball socket wall projecting inwardly from said eye opening and having opposed openings therein, actuating means projecting through said wall region and journaled within said insert body for rotation relative to said insert body, at least one cutter blade, means mounting said cutter blade on said insert body for outward movement in a cutting plane, said cutter blade normally extending beyond said molding surface such as to be embedded in said socket wall incident to molding, and means operatively connected to said actuating means for rotating said cutter blade and for moving said opposed pins to said retracted position.

2. In a mold including a mold section having a mold wall region defining an eye opening, the improvement comprising an eye insert including an insert body providing a semi-spherical molding surface extending inwardly of said region and flaring outwardly in relation to said eye opening, said body having a substantially planar molding surface at its inner end extending at right angles to the axis of symmetry of said semi-spherical molding surface, opposed pins projecting from said semi-spherical molding surface, means mounting said pins for movement between retracted and extended positions relative to said semi-spherical molding surface, said molding surfaces and said opposed pins when in said extended position having built up thereon during molding a semi-spherical eyeball socket wall projecting inwardly from said eye opening, said eyeball socket having opposed openings therein and being closed at its inner end by a transverse base which is adapted to be cut away such as to permit the assembly of an eye within said socket wall, a shaft projecting through said wall region and journaled within said insert body for rotation relative to said insert body about said axis of symmetry, at least one cutter blade within said insert body inwardly of said planar molding surface, means mounting said cutter blade for outward movement in a cutting plane parallel to and adjacent said planar molding surface, said cutter blade normally extending beyond said semi-spherical molding surface such as to be embedded in said socket wall contiguous to said base incident to molding, and means operatively connected to said shaft for rotating said cutter blade about said axis of symmetry and for moving said opposed pins to said retracted position.

3. In a mold according to claim 2, respective springs operatively connected to said pins and biasing the same into said retracted position.

4. In a mold according to claim 3, a spring operatively connected to said cutter blade and biasing the same into a normal position wherein said blade extends beyond said semi-spherical molding surface and enabling said cutter blade to move outwardly from said normal position in response to rotation thereof.

5. An eye insert including an insert body providing a semi-spherical molding surface, opposed pins projecting from said semi-spherical molding surface and disposed at right angles to the axis of symmetry thereof, means mounting said pins for movement between retracted and extended positions relative to said semi-spherical molding surface, said molding surface and said opposed pins when in said extended position having built up thereon during molding a semi-spherical eyeball socket wall having opposed openings therein, at least one cutter blade on said insert body, means mounting said cutter blade for outward movement in a cutting plane, means biasing said cutter blade to a normal position extending beyond said semi-spherical molding surface such as to be embedded in said socket wall incident to molding, and actuating means operatively connected to said cutter blade for moving the same and for simultaneously moving said opposed pins to said retracted position.

6. An eye insert including an insert body providing a semi-spherical molding surface and having a substantially planar molding surface at its inner end extending at right angles to the axis of symmetry of said semi-spherical molding surface, opposed pins projecting from said semi-spherical molding surface, means mounting said pins for movement between retracted and extended positions relative to said semi-spherical molding surface, respective springs normally biasing said pins into said retracted position, said molding surface and said opposed pins when in said extended position having built up thereon during molding a semi-spherical eyeball socket wall having opposed openings therein and closed at its inner end by a transverse base which is adapted to be cut away, at least one cutter blade on said insert body inwardly of said planar molding surface, means mounting said cutter blade for outward movement in a cutting plane parallel to and adjacent said planar molding surface, means biasing said cutter blade to a normal position extending beyond said semi-spherical molding surface such as to be embedded in said socket wall contiguous to said base incident to molding, and actuating means operatively connected to said cutter blade for moving the same and for simultaneously moving said opposed pins to said retracted position.

7. An eye insert including an insert body providing a semi-spherical molding surface, opposed pins projecting from said semi-spherical molding surface, means mounting said pins for movement between retracted and extended positions relative to said semi-spherical molding surface, respective springs normally biasing said pins into said retracted position, said molding surface and said opposed pins when in said extended position having built up thereon during molding a semi-spherical eyeball socket wall having opposed openings therein, at least one cutter blade on said insert body, means mounting said cutter blade for outward movement in a cutting plane, means biasing said cutter blade to a normal position extending beyond said semi-spherical molding surface such as to be embedded in said socket wall contiguous to said base incident to molding, and actuating means operatively connected to said cutter blade for rotating the same about the axis of symmetry of said semi-spherical molding surface and for simultaneously moving said opposed pins to said retracted position, said actuating means including an actuating shaft journaled within said insert body for rotation about said axis of symmetry, means operatively connecting said cutter blade to said actuating shaft, a lead screw on said actuating shaft, a cam member engaging said lead screw and movable relative thereto in response to rotation of said actuating shaft, and respective followers on said pins engaging said cam member and normally maintaining said pins in said extended position, movement of said cam member relative to said lead screw in response to rotation of said actuating shaft permitting said pins to return to said retracted position.

8. An eye insert including an insert body providing a semi-spherical molding surface and having a substantially planar molding surface at its inner end extending at right angles to the axis of summetry of said semi-spherical molding surface, opposed pins projecting from said semi-spherical molding surface, means mounting said pins for movement between retracted and extended positions relative to said semi-spherical molding surface, respective springs normally biasing said pins into said retracted position, said molding surface and said opposed pins when in said extended position having built up thereon during molding a semi-spherical eyeball socket wall having opposed openings therein and closed at its inner end by a transverse base which is adapted to be cut away, at least one cutter blade on said insert body inwardly of said planar molding surface, means mounting said cutter blade for outward movement in a cutting plane parallel to and adjacent said planar molding surface, means biasing said cutter blade to a normal position extending beyond said semi-spherical molding surface such as to be embedded in said socket wall contiguous to said base incident to molding, and actuating means operatively connected to said cutter blade for moving the same about said axis of symmetry and for simultaneously moving said opposed pins to said retracted position, said actuating means including an actuating shaft journaled within said insert body for rotation about said axis of symmetry, means operatively connecting said cutter blade to said actuating shaft, a lead screw on said actuating shaft, a cam member engaging said lead screw and movable relative thereto in response to rotation of said actuating shaft, and respective followers on said pins engaging said cam member and normally maintaining said pins in said extended position, movement of said cam member relative to said lead screw in response to rotation of said actuating shaft permitting said pins to return to said retracted position.

9. In a mold including a mold section having a mold wall region defining an eye opening, the improvement comprising an eye insert including an insert body providing a molding surface extending inwardly of said region, at least one pin projecting from said molding surface, means mounting said pin for movement between retracted and extended positions relative to said molding surface, said molding surface and said pin when in said extended position having built up thereon during molding an eyeball socket wall projecting inwardly from said eye opening and having an opening therein, actuating means projecting through said wall region, at least one cutter blade, means mounting said cutter blade on said insert body for movement through a cutting cycle, and means operatively connected to said actuating means for moving said cutter blade through said cutting cycle and for moving said pin to said retracted position.

10. An eye insert including an insert body providing a molding surface, at least one pin projecting from said molding surface, means mounting said pin for movement between retracted and extended positions relative to said molding surface, said molding surface and said pin when in said extended position having built up thereon during molding an eyeball socket wall having an opening therein, at least one cutter blade on said insert body, means mounting said cutter blade for movement relative to said molding surface, means biasing said cutter blade to a normal position extending beyond said molding surface such as to be embedded in said socket wall incident to molding, and actuating means operatively connected to said cutter blade for moving said cutter blade and for simultaneously moving said pins to said retracted position.

References Cited in the file of this patent
UNITED STATES PATENTS

| | | |
|---|---|---|
| 2,728,948 | Kallus | Jan. 3, 1956 |
| 2,730,765 | Crafton et al. | Jan. 17, 1956 |
| 2,817,116 | Miller et al. | Dec. 24, 1957 |
| 2,830,325 | Bray | Apr. 15, 1958 |
| 3,015,856 | Cohn | Jan. 9, 1962 |
| 3,031,718 | Adams | May 1, 1962 |
| 3,101,993 | Cohn | Aug. 27, 1963 |